/ Patented Apr. 19, 1938

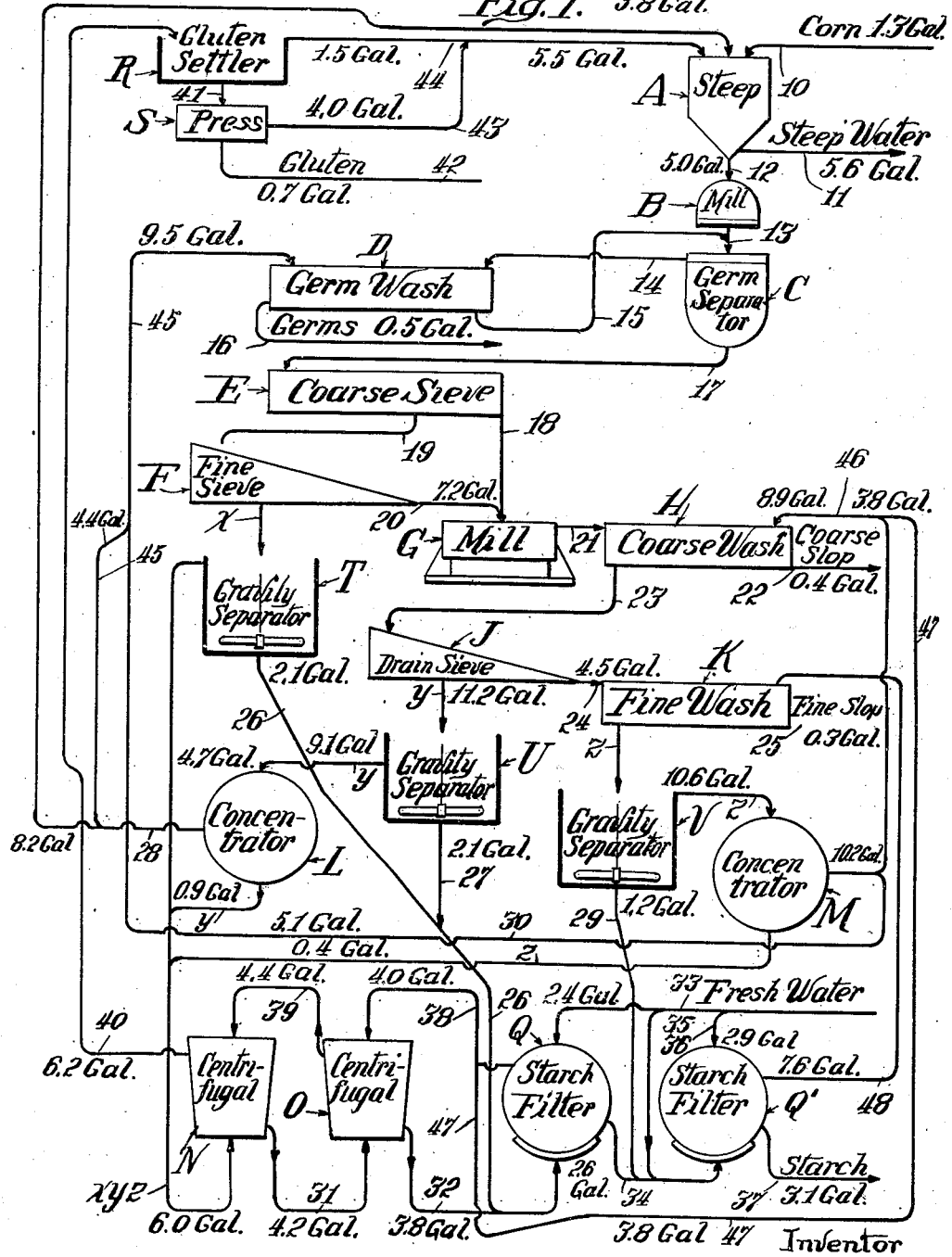

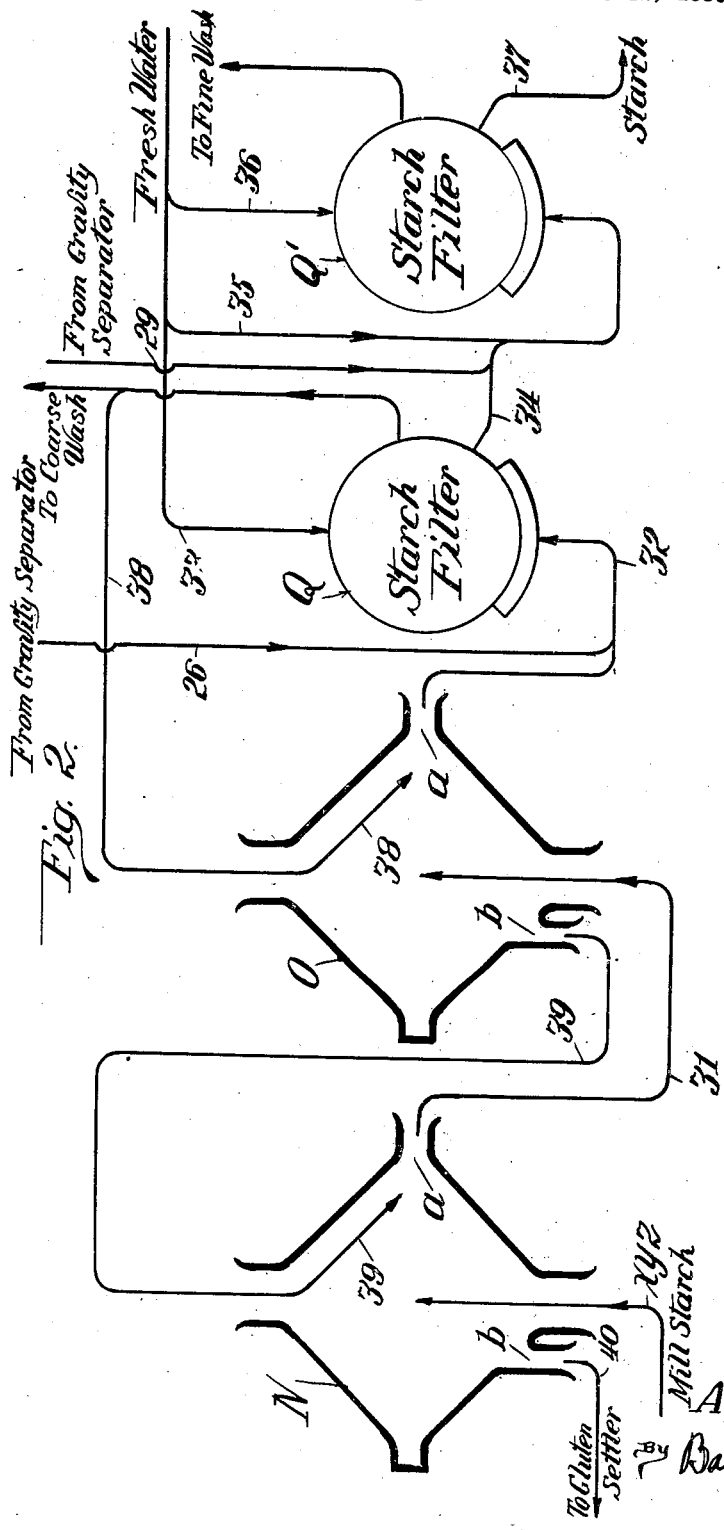

2,114,497

UNITED STATES PATENT OFFICE 2,114,497

MANUFACTURE OF STARCH

Alfred H. Kelling, Oak Park, Ill., assignor to International Patents Development Company, Wilmington, Del., a corporation of Delaware Original application June 12, 1933, Serial No. 675,412. Divided and this application June 4, 1936, Serial No. 83,539

6 Claims. (Cl. 127—68)

This invention relates to the manufacture of starch from corn by the wet method; and particularly to a process in which all or substantially all, of the process waters (except the steep water and the water absorbed in the discharged solids) are returned to the process for re-use, for the purpose of saving the solids, soluble and insoluble, therein, and preventing the pollution of streams which results from discharging process waters from the factory.

In the manufacture of starch from corn it has been customary to steep the corn and withdraw the steep water to evaporators for recovery of the corn solubles contained therein. The steeped corn is then comminuted and subjected to separating operations in water for removal of the germs, hulls and fibers. The usual method has been to break up the corn coarsely, remove and wash the germs, grind the residue as finely as possible, and then subject the ground material to what is known as a coarse slop separating or washing operation in which starch and gluten is washed from the slop (hulls and fibrous part of the corn kernels) by passing the material through copper reels or over copper covered shakers. The mixture of starch, gluten and water from this operation is then passed through fine sieves to remove the residual slop particles, which latter are then subjected to a fine slop washing operation in a series of silk covered reels or on silk covered shakers, for the purpose of washing out of the fine slop the starch and gluten which it contains. The mill starch (starch, gluten and water) from the germ, coarse slop and fine slop separating operations is then tabled, according to customary practice, for the purpose of separating the gluten from the starch. The starch removed from the tables, usually by flushing, is dewatered and washed with fresh water in washing filters. The gluten is allowed to settle in gluten settlers. The starch filtrate and wash water from the starch filters and the gluten settler water are returned to the process for re-use.

Application Serial No. 675,412, filed June 12, 1933, of which the present application is a division, discloses several alternative methods whereby the separation of the gluten from the starch, ordinarily performed on starch tables, is accomplished in a particularly advantageous manner by means of centrifugal force; the centrifugal machines and other instrumentalities for carrying out the process being arranged so that, in the first place, all process waters, except as noted above, may be returned to the process, in order to save solubles and prevent stream pollution; in the second place, so that the water which by the nature of the process contains the largest quantity of solubles, color substance and other impurities and which remains longest in the process under conditions favorable to bacterial development, to wit, the gluten settler water, will be re-used exclusively for steeping while the other process waters will be used for the separating operations; and, in the third place, so that the solubles and other impurities so far as possible will be concentrated in the process water going back to the steeping system. No inconvenience results from using in the steeps a process water which is more or less infected and contains considerable quantities of soluble including yellow color substances, because, at this stage of the process, the material treated consists of unbroken corn, little susceptible to contamination by soluble impurities or to micro-organic action, and because the high temperatures and sulphur dioxide concentrations employed in the steeps largely inhibit the action of the micro-organisms. In the separating operations, however, the temperatures are lower and much less sulphur dioxide is used and the material is in a finely divided state and therefore highly susceptible to the action of micro-organisms and to contamination by solubles including color substances. By concentrating the solubles and other impurities, including colloidal substances and micro-organisms, in the process water returned to the steeps, the other process waters are in a much purer state and by using these waters exclusively in the separating operations on the comminuted material the washing of the starch is facilitated; and, with the same washing equipment, a purer starch is obtained; although it may be said that because of the character of the impurities these impurities cannot be removed from the starch completely even with repeated washings. Moreover the color of the starch is improved since the substances which tend to give corn starch its yellow tinge are, according to the present invention, to a large extent eliminated from the process waters used in the wet starch system (germ and coarse and fine slop separations) and concentrated in the process waters re-used in the steeps.

While the invention makes possible the re-use of all gluten settler water, with its high solubles, color and bacteria content in the steeps, none going to the wet starch system, or being discharged to the sewer, some advantage of the present invention might be obtained even if small quantities of the gluten settler water were discharged to the sewer or re-used, with other process waters, in the wet starch system; although such expedients are neither necessary nor desirable.

The primary object of the present invention is to facilitate the operation of centrifuging the mill starch, that is, the mixture of starch, gluten and water from the separating operations, by subjecting one or all of the three streams of mill starch from the germ, coarse slop and fine slop separations to a gravity separation or separations, which remove a certain amount of starch, substantially free of gluten from the mill starch mixture or mixtures, so that the work of the centrifugal machines will be reduced. This in a large factory will effect a considerable economy since centrifugal machines are costly and expensive to operate.

The invention is illustrated in the accompanying drawings, wherein:

Fig. 1 is a flow-sheet diagram of the entire process; and

Fig. 2 is a more detailed diagram of the centrifugal system.

It will be understood that Fig. 1 of the drawings, for the purpose of simplification, shows the single units where in practice there will be batteries, for example, of steep tanks, sieves and the like. The showing of machinery is purely diagrammatic. Any suitable apparatus may be used for carrying out the process steps as illustrated.

The numerals in Fig. 1 of the drawings followed by the abbreviation "Gal." indicate quantities of water present measured in gallons per bushel of corn ground.

These figures are to be taken as illustrating a practical water balance. They might vary considerably for different installations.

The inventions common to this application and the other forms disclosed in parent case Serial No. 675,412 are not claimed herein but in the parent case, or other divisions thereof.

Referring to Fig. 1, A designates the steeping system; B the mill for cracking corn to release the germs; C the germ separator in which the germs are floated off and separated from the rest of the corn; D the apparatus for washing the germs; E a coarse sieve which receives the degerminated corn from the separator C; F a fine sieve for separating a starch, gluten and water mixture (mill starch) from the degerminated corn; G the mill for grinding the slop and grits from the coarse sieve E and fine sieve F; H the coarse slop separating or washing system for washing the ground material from the mill G; J a draining sieve through which the mill starch from the coarse slop wash is passed; K the fine slop washing system for removing from the tailings of the drain sieves J the fine particles of bran and fiber; T, U and V gravity separators for removing starch from the mill starch mixtures derived from the germ, coarse slop and fine slop separating operations, respectively; L and M concentrators, for example, filters, for extracting water from the mill starch streams after starch has been removed therefrom by the gravity separators U and V; N and O centrifugal machines for separating gluten, and preferably solubles, from the mill starch; Q, Q' washing filters of the displacement type, operated by vacuum or pressure, in which the starch from the centrifugal machines and gravity separators is first dewatered and then washed with fresh water. By fresh water is meant either tap water or other water containing a small quantity of soluble substances. R is a settler for separating gluten from a portion of the water in which it is suspended, and S a press for completing such separation.

The connections between the above enumerated instrumentalities (referred to as pipes, although they may in some cases be troughs, conveyors or other conducting means) will be referred to in connection with the description of the operation of the system which is as follows:

*Operation of process.*—The corn containing 1.3 gallons of water enters the steeping system A at 10. From the steeping system 5.6 gallons of steep water is withdrawn through pipe 11 to the evaporators where it is evaporated to a sufficient extent to mix with the slops and gluten for the manufacture, for example, of cattle food. In this or other suitable way the corn solubles, which are, to a large extent leeched out of the corn in the steeping system, are saved together with the solubles which are contained in the process waters from the separating operations that follow the steeping of the corn.

The steeped corn with 5.0 gallons of water passes through pipe 12 to the mill B where it is coarsely ground. The ground material passes through pipe 13 to the germ separator C from which the germs are floated off, passing through pipe 14 to the germ washing system D. Starch milk passes from the germ wash through pipe 15 back to the separator C for supplying liquid of the necessary gravity for effecting the separation as between the germs and the rest of the corn. The washed germs are discharged from the germ washing system at 16 with 0.5 gallon of water. The degerminated corn is discharged from the separator C through pipe 17 to the coarse sieve E. The tailings or slop from the coarse sieve E pass through pipe 18 to the mill G. The starch milk passes through pipe 19 to a fine sieve F, the tailings or grits from which pass through pipe 20 to the mill G. The combined streams 18 and 20 going to the mill carry 7.2 gallons of water. The grits and slop entering mill G are there ground as finely as possible. The ground material passes through pipe 21 to the coarse washing system H which consists of copper reels or shakers, ordinarily, over which the material is passed successively. The coarse slop containing 0.4 gallon of water passes out of the system at 22. The water from the coarse slop wash containing starch and gluten and some fine bran particles passes through pipe 23 to the drain sieve J. The tailings from this sieve, containing 4.5 gallons of water, pass through pipe 24 to the fine slop washing system K which consists ordinarily of reels or shakers covered with silk bolting cloth. The fine slop, containing 0.3 gallon of water is discharged from the system at 25.

The mill starch stream from the germ system passes from the fine sieve F through pipe $x$ to the gravity separator T. In this apparatus the starch being heavier than the gluten subsides to the bottom of the vessel where it forms a rather definite stratum. The settled starch, which contains substantially no gluten, is withdrawn through pipe 26 to the starch washing system, preferably to the first filter Q, since this starch being derived from the germ system will contain a relatively large quantity of solubles. The starch withdrawn through pipe 26 may contain 2.1 gallons of water. The rest of the starch in the gravity separator T passes through another branch of pipe $x$ to the first centrifugal N, the quantity being 4.7 gallons.

The mill starch from the coarse wash H passes from the drain sieve J through a pipe $y$ to the gravity separator U, the amount being 11.2 gallons. The starch settled in the gravity separator U, containing 2.1 gallons, passes through pipes 27, 25 to the washing filter Q. The gluten and water in the upper part of the separator, which will, of course, contain some starch, passes through another section of pipe $y$, the amount being 9.1 gallons, to the concentrator L which may be a settling tank but is preferably a filter, and which extracts 8.2 gallons of water that passes from the concentrator L into pipe 28. The concentrated material passes with 0.9 gallon of water into another section of pipe $y$ which leads to pipe $x$ and centrifugal N.

The mill starch from the fine wash K passes through pipe $z$ to the gravity separator V. The starch collecting in the bottom of the separator, together with 1.2 gallons of water, passes through pipe 29 to the starch washing system, preferably to the second filter Q', since this starch will have a small solubles content. The rest of the material in the gravity separator V passes through another section of the pipe $z$, the amount being 10.6 gallons, to the concentrator M, which removes 10.2 gallons of water that is discharged from the concentrator through pipe 30. The material concentrated in concentrator M passes through a third section of the pipe $z$ which leads to pipe $x$ and the centrifugal system. This material carries 0.4 gallon of water.

The starch and gluten mixtures from the gravity separator T and the concentrators L and M pass through the pipe $xyz$ to the centrifugal machine N, the quantity being 6.0 gallons. The underflow from contrifugal N, (4.2 gallons) primarily starch, passes through pipe 31 to the centrifugal machine O. The underflow from the centrifugal machines O (3.8 gallons) passes through pipe 32 to the starch filter Q where the starch is first dewatered and then washed with 2.4 gallons of fresh water introduced through pipe 33. The filtered starch (2.6 gallons) passes from filter Q through pipe 34, where it is diluted with 4.0 gallons of fresh water through branch pipe 35 to filter Q' where it is again dewatered and then washed with 2.9 gallons of fresh water introduced through pipe 36. The washed starch is discharged from filter Q', with 3.1 gallons of water through pipe 37. 4.0 gallons of filtrate from filter Q pass through pipe 38 to the underflow zone of centrifugal O. The overflow from centrifugal O, 4.4 gallons, passes through pipe 39 to the underflow zone of centrifugal N. By introducing the wash water into the underflow zones of the centrifugal machines, the solubles are concentrated in the overflow from centrifugal N. This concentration of solubles is due in part to dilution, but not wholly, since on mathematical grounds the concentration of solubles, according to actual experiments, cannot be accounted for wholly on the dilution principle. The forcing of the wash water into the underflow zone of the centrifugal, in each case, must act to displace the solubles containing water in the underflow or starch zone as well as to dilute the material in the starch zone. Water containing solubles and gluten is split from the entering starch milk before the latter mingles with wash water going to the starch in the underflow zone.

The arrangement of centrifugals and starch filters is shown in greater detail in Fig. 2. The filtrate from filter Q going to centrifugal O through pipe 38 is shown as delivered to the starch zone $a$ of the centrifugal, that is to the part of the centrifugal from which the underflow carrying the starch is delivered. In a similar manner the overflow from centrifugal O passes through pipe 39 to the underflow or starch zone $a$ of centrifugal N. The gluten or overflow zones are indicated at $b$.

The process waters are returned to the process in the following manner:

The overflow from centrifugal N, 6.2 gallons, passes through pipe 40 to the settler R where the gluten is settled out and passes through pipe 41 to press S. The gluten, containing 0.7 gallon of water, is discharged from the press at 42. The water from the press, 4.0 gallons, goes through pipe 43 to the pipe 44 which conducts water from the settler, 1.5 gallons, to the steeps. Due to the high concentration of the mill starch stream going to the centrifugal system, the water content of the overflow from the centrifugal system is insufficient for steeping the corn. Consequently it is possible to discharge from the system through the steeps a process water other than gluten settler water; and preferably the process water so discharged, according to the present process, is the relatively high solubles water in pipe 28 leading from the first concentrator L. 3.8 gallons of this water is returned to the steeping system. 4.4 gallons of this water is returned through pipe 45 to the germ wash D, as a wash water for washing starch and gluten from the germs.

10.2 gallons of water are discharged from the concentrator M. 5.1 gallons go through pipe 30 to pipe 45 and thence to the germ wash. 5.1 gallons go through the branch pipe 46 to the coarse wash H. 3.8 gallons of filtrate and wash water from starch filter Q pass through pipe 47 to pipe 46 and thence to the coarse wash H. All of the filtrate from the filter Q', 7.6 gallons, a water containing a very small quantity of solubles or other impurities passes through pipe 48 to the fine wash K.

It will be seen that because the mill starch, or mixture of starch, gluten and water, is first relieved of a considerable load of solids, i. e. starch by the gravity separations at T, U and V, and is then concentrated at L and M, a concentration that can be carried to a high point, because of the precedent removal of solids in the gravity separators, the number of centrifugal machines can be reduced to a minimum and the amount of gluten settler water is so reduced that it is possible to discharge from the system through the steeps process waters in addition to the discharge at this point of all the gluten settler water. This makes it possible to use a relatively pure process water, that is the filtrate from the second filter Q', exclusively, for the final fine slop wash. The solubles in the starch filtered at Q' are low because of the method of centrifuging the mill starch which involves not only removal of the gluten but the concentration in the overflow of the major portion of the solubles in the mill starch.

The concentration of the starch and gluten liquor going to the centrifugal system also facilitates the separation as between starch and gluten. A denser liquid is more readily retained in the centrifugal machine long enough so that the separation can take place without making the discharge orifices so small that they are likely to be clogged.

While the process has been described as applied to the manufacture of starch from corn, it may be used for the treatment of other materials where operating conditions are similar. All adaptations and modifications of the specifically described process which come within the scope of the appended claims are intended to be covered by the patent.

I claim:

1. A continuous process of manufacturing starch from corn comprising: steeping and comminuting the corn; subjecting the comminuted corn to separating operations in water yielding two or more streams of mill starch, of different soluble contents; extracting a portion of the starch substantially free of gluten by gravity from each of said streams; subjecting the starch so extracted to a filtering operation; concentrating the remaining portion of the mill starch streams light in solubles; mixing the concentrated material with the remaining portion of the mill starch stream heaviest in solubles; subjecting the last named mixture to a series of centrifuging operations in which the underflow carrying the starch passes progressively from the first to the last centrifuging operations of the series and the overflow carrying the gluten moves counter-currently to the underflow; introducing the starch extracted by the centrifuging operations to the filtering operation to which the starch previously extracted by gravity was subjected; and re-using in the process as the operations are continued on fresh material the waters eliminated by said operations.

2. The process of manufacturing starch from corn, in which substantially all process waters, except the steep water and moisture in the discharged solids, are re-used in the process, comprising: steeping the corn; comminuting it and subjecting it to germ and slop separating operations in water yielding a mixture of starch, gluten and water; separating by a stratifying gravity separations some of the starch substantially free of gluten from said mixture; concentrating the rest of the mixture by extraction of water and re-using said water in the separating operations; centrifuging the concentrated mixture to separate the gluten from the starch; removing water from the gluten by a settling operation; and re-using said water in the steeping operation.

3. The process of manufacturing starch from corn, in which substantially all process waters, except the steep water and moisture in the discharged solids, are re-used in the process, comprising: steeping the corn; comminuting it and subjecting it to germ and slop separating operations in water yielding a mixture of starch, gluten and water; separating by a stratifying gravity separation some of the starch substantially free of gluten from said mixture; concentrating the rest of the mixture by extraction of water and re-using said water in the separating operations; centrifuging the concentrated mixture to separate the gluten from the starch; removing water from the gluten by a settling operation; re-using said water in the steeping operation; washing the starch separated by gravity and centrifugal force as aforesaid, on washing filters; and re-using the water from said filtering operations in the separating operations.

4. Method of treating mill starch for the separation of gluten from the starch and the concentration of solubles with the gluten which comprises: first removing starch substantially free of gluten from the mill starch by a stratifying gravity separation; and then subjecting the residue of the mixture to a contrifuging operation in which a wash water is introduced into into the starch zone of the centrifugal.

5. Process of manufacturing starch from corn comprising: steeping and comminuting the corn; subjecting the comminuted material first to a germ separating operation, then to a coarse slop wash and finally to a fine slop wash; subjecting the mill starch to a stratifying gravity separation which removes therefrom some of the starch substantially free from gluten; concentrating the rest of the mill starch by extraction of water; subjecting the concentrated mill starch to a centrifuging operation which divides the same into a gluten carrying overflow and a starch carrying underflow; settling out the gluten from the overflow and returning substantially all of the settler water to the steeping operation; washing the starch from the gravity separating and centrifuging operation; and re-using the waters extracted from the mill starch and derived from the washing of the starch in said germ separation and coarse and fine washing operations so that substantially all process waters are returned to the process except the steep water and the water absorbed in the discharged solids.

6. Process of manufacturing starch from corn comprising: steeping and comminuting the corn; subjecting the comminuted material first to a germ separating operation, then to a coarse slop wash and finally to a fine slop wash; subjecting the mill starch to a stratifying gravity separation which removes therefrom some of the starch substantially free from gluten; concentrating the rest of the mill starch by extraction of water; subjecting the concentrated mill starch to a centrifuging operation which divides the same into a gluten carrying overflow and a starch carrying underflow; settling out the gluten from the overflow and returning substantially all of the settler water to the steeping operation; washing the starch from the gravity separating and centrifuging operation; and re-using the waters extracted from the mill starch and derived from the washing of the starch in said germ separation and coarse and fine washing operations at points nearer the steeping end of the system in proportion to the soluble contents of said waters.

ALFRED H. KELLING.